United States Patent [19]

Isozumi et al.

[11] Patent Number: 4,926,078
[45] Date of Patent: May 15, 1990

[54] BRUSH AND TERMINAL ASSEMBLY FOR ENGINE STARTER

[75] Inventors: Shuzoo Isozumi; Keiichi Konishi, both of Himeji, Japan

[73] Assignee: Mitsubishi Denki Kabushiki Kaisha, Tokyo, Japan

[21] Appl. No.: 341,605

[22] Filed: Apr. 21, 1989

[30] Foreign Application Priority Data

Apr. 21, 1988 [JP] Japan .................. 63-100486

[51] Int. Cl.$^5$ ................ H02K 13/00; H01R 39/06
[52] U.S. Cl. .................... 310/71; 310/239; 310/83
[58] Field of Search ............ 74/6, 7 A, 7 E; 123/179 R, 179 M; 290/38 R; 310/68 D, 71, 239, 242, 83; 335/126, 131

[56] References Cited

U.S. PATENT DOCUMENTS

| | | | |
|---|---|---|---|
| 3,210,554 | 10/1965 | Seilly et al. | 123/179 M |
| 4,355,253 | 10/1982 | Vollbrecht | 310/239 |
| 4,593,220 | 6/1986 | Cousins et al. | 310/239 |
| 4,673,838 | 6/1987 | Takagi et al. | 310/239 |
| 4,695,735 | 9/1987 | Tallis, Jr. et al. | 123/179 M |
| 4,754,184 | 6/1988 | Morikane et al. | 310/239 |
| 4,801,909 | 1/1989 | Fasola | 335/126 |
| 4,816,712 | 3/1989 | Tanaka | 310/237 |
| 4,838,100 | 6/1989 | Tanaka | 290/38 R |
| 4,852,417 | 8/1989 | Tanaka | 310/83 |
| 4,862,027 | 8/1989 | Isozumi et al. | 310/83 |

Primary Examiner—Patrick R. Salce
Assistant Examiner—D. L. Rebsch
Attorney, Agent, or Firm—Sughrue, Mion, Zinn, Macpeak & Seas

[57] ABSTRACT

A brush and terminal assembly for use in an engine starter having a motor including a commutator mounted on an armature rotary shaft comprises a support plate having two major surfaces, a central opening for receiving therein the commutator of the motor and a terminal bolt and a connection terminal unit. Positive and negative brushes are mounted to one side of the support plate and spring biased for resilient contact with the commutator in the central opening. A pair of stationary contacts are projectingly mounted to the other side of the support plate for use as contacts of an on/off switch of the electric motor, and two stationary contacts are electrically connected to the terminal bolt and the connecting terminal unit, respectively. The lead conductors connected to and extending from the positive brushes are connected together to the connecting terminal unit.

2 Claims, 6 Drawing Sheets

F I G. 6
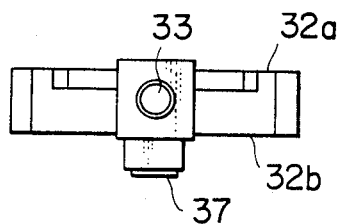
F I G. 7
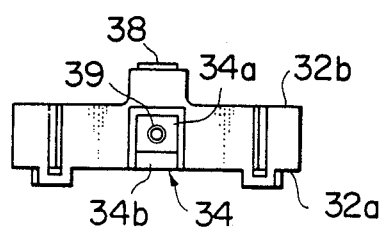
F I G. 8
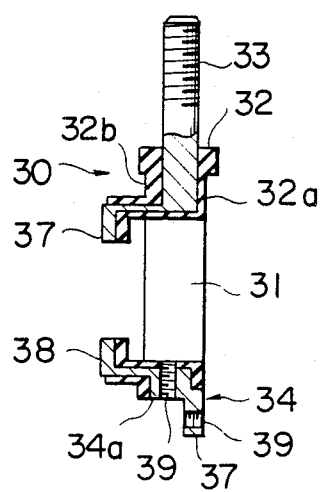

4,926,078

BRUSH AND TERMINAL ASSEMBLY FOR ENGINE STARTER

BACKGROUND OF THE INVENTION

This invention relates to a brush and terminal assembly for an engine starter.

FIG. 1 illustrate one example of a conventional coaxial engine starter. The illustrated coaxial engine starter comprises a dc motor 1 having a hollow armature rotary shaft 2 defining an inner bore 2a therein and a solenoid switch 3 disposed at the rear end of the dc motor 1. The solenoid switch 3 has a plunger rod 3a which supports a push rod 4 extending into the inner bore 2a of the armature rotary shaft 2. The coaxial engine starter also comprises an output rotary shaft 5 coaxially disposed at the front end of the armature rotary shaft 2. The output rotary shaft 5 has its rear end inserted into the inner bore 2a of the armature rotary shaft 2 and abuts at its inserted rear end with the front end of the push rod 4 within the armature rotary shaft 2 so that the output rotary shaft 5 may be moved forward when the plunger rod 3a of the solenoid switch 3 is electromagnetically pushed forward.

In the coaxial engine starter, a commutator 6 is mounted at the rear portion of the armature rotary shaft 2, and the commutator 6 is slidably contacted by a plurality of brushes 9 supported by brush holders 8 mounted to a mounting plate 7 to constitute a commutator assembly. At the rear end of the commutator assembly and in front of the solenoid switch 3, there is mounted a terminal assembly 12 in which two terminal bolts 10 and 11 are resin molded as shown in FIG. 2. On one side of this terminal assembly 12, two stationary contacts 14 and 15 which can be connected to each other by a movable bridging contact 13 of the solenoid switch 3 are provided. These stationary contacts 14 and 15 are formed integral with and electrically connected to the terminal bolts 10 and 11.

As shown in FIG. 3, the terminal bolt 10 is connected to a battery B mounted on a vehicle by a line 16, and the terminal bolt 11 is connected to the positive brushes 9 by a line 17 and to a solenoid coil 18 of the solenoid switch 3.

In FIG. 1, a pinion 19 is mounted on the front end of the output rotary shaft 5 and is capable of engaging and disengaging an engine ring gear (not shown) by reciprocating motion of the output rotary shaft 5, a planetary speed reduction gear 20 is provided for reducing the rotational speed of the armature rotary shaft 2, and an over-running clutch 21 is provided for transmitting the speed-reduced rotation of the planetary speed reduction gear 20 to the output rotary shaft 5 and for preventing the rotation of the output rotary shaft 5 to be reverse-transmitted to the dc motor 1.

However, with the above-described coaxial engine starter, the brush holder mounting plate 7 and the terminal unit 12 which constitutes the commutator of the dc motor 1 are formed as separate components, so that the brush holder mounting plate 7 must first be installed on the rear end of the yoke 1a of the dc motor 1 and must be held by the rear bracket 1b, and thereafter the terminal unit 12 and the solenoid switch 3 are disposed in the named order on the rear portion of the rear bracket 1b and then the solenoid switch 3 is secured by the bolt 22 to the front bracket 1c. Therefore, the assembly is very troublesome and many wirings are placed outside of the outer circumference of the machine frame, impeding easy installation of the starter to the engine because the electrical connection between the positive side brush 9 and one of the stationary contacts 14 must be achieved by connecting the lead conductor 17 from the brush 9 to the terminal bolt 10 projecting outwardly from the starter machine frame, and the lead-out portion of the current coil 18 of the solenoid switch 3 must also be connected to the terminal bolt 10. Moreover, even though the coaxial starter is designed so as to simplify the configuration of the starter into a generally cylindrical shape in order to make lay-out design of the engine compartment of the vehicle easier and more efficient, the above-mentioned two terminal bolts projecting out from the machine frame degrade the easiness and the efficiency of the lay-out design.

SUMMARY OF THE INVENTION

Accordingly, the primary object of the present invention is lo provide a brush and terminal assembly for use in an engine starter which eliminates the above problems of the conventional design.

Another object of the present invention is to provide a brush and terminal assembly for use in an engine starter in which no electrical wiring conductor projects outside of the starter.

Still another object of the present invention is to provide a brush and terminal assembly for use in an engine starter in which a portion of the commutator of the electric motor and the stationary contacts are assembled in a unit so that no electrical wiring conductor projects outside of the starter and the assembly is easy.

With the above objects in view, the brush and terminal assembly of the present invention for use in an engine starter having a motor including a commutator mounted on an armature rotary shaft comprises a support plate having two major surfaces, a central opening for receiving therein the commutator of the motor and a terminal bolt and a connection terminal unit. Positive and negative brushes are mounted to one side of the support plate and spring biased for resilient contact with the commutator in the central opening. A pair of stationary contacts are projectingly mounted to the other side of the support plate for use as contacts of an on/off switch of the electric motor, and two stationary contacts are electrically connected to the terminal bolt and the connecting terminal unit, respectively. The lead conductors connected to and extending from the positive brushes are connected together to the connecting terminal unit.

BRIEF DESCRIPTION OF THE DRAWINGS

The present invention will become more readily apparent from the following detailed description of the preferred embodiment of the present invention taken in conjunction with the accompanying drawings, in which:

FIG. 6 is a top view of the brush and terminal assembly shown in, FIG. 4;

FIG. 7 is a bottom view of the brush and terminal assembly shown in FIG. 4;

FIG. 8 is a sectional side view taken along line VIII—VIII of FIG. 5;

DESCRIPTION OF THE PREFERRED EMBODIMENT

Figure 1:
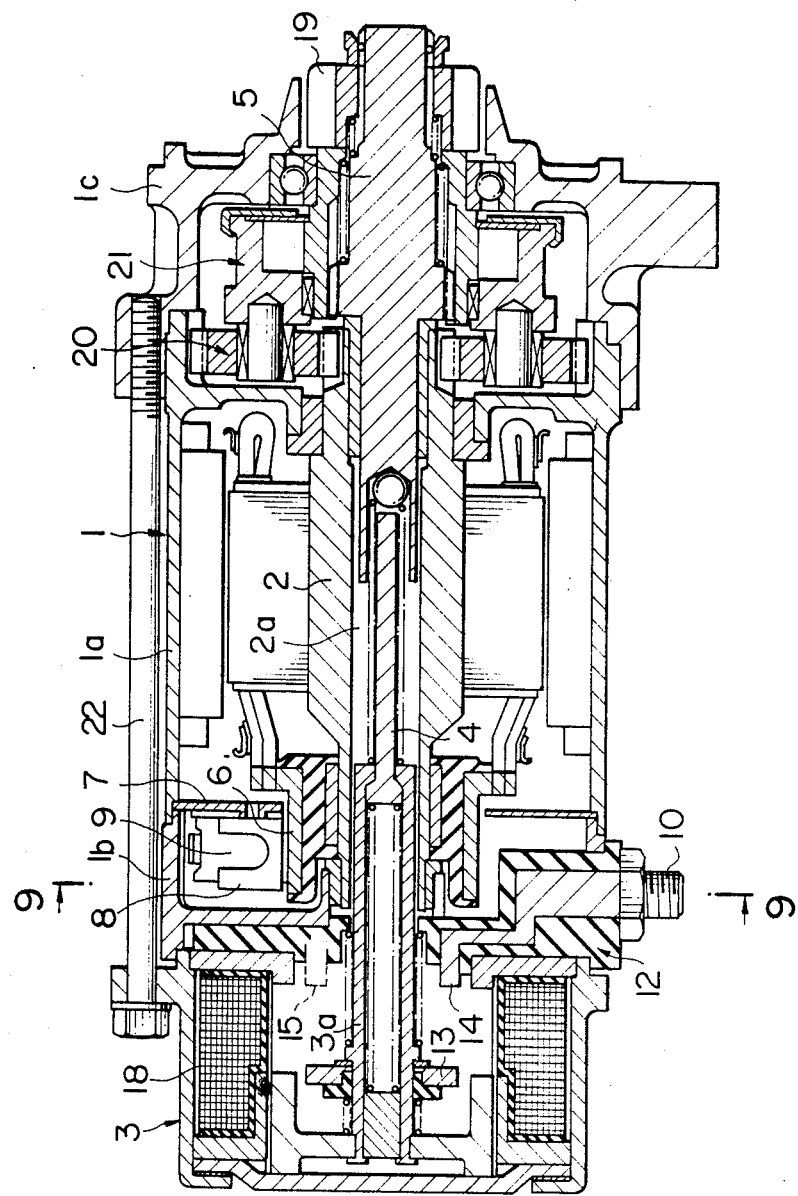
FIG. 1 is a sectional side view illustrating one example of a conventional coaxial engine starter.
Figure 2:
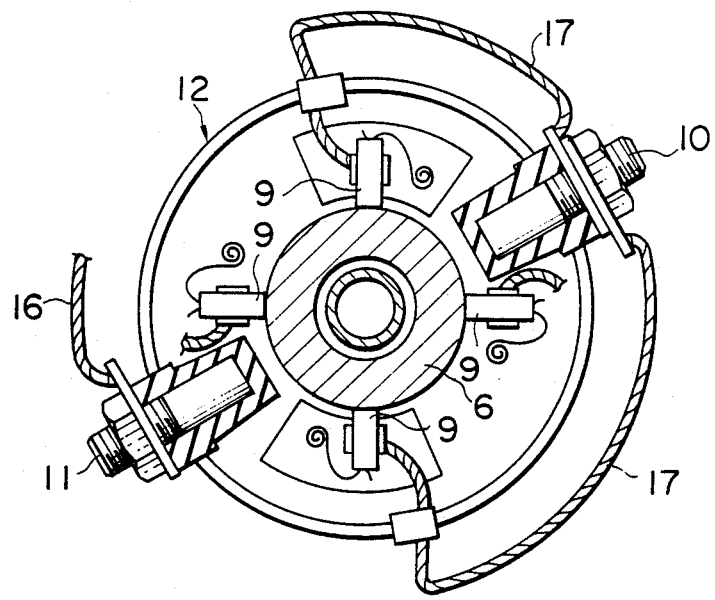
FIG. 2 is a view illustrating the brushes and terminal bolts of the conventional coaxial engine starter.
Figure 3:
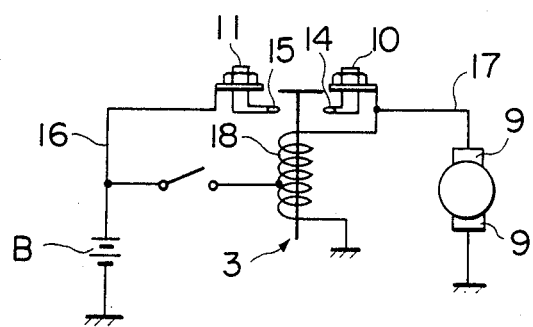
FIG. 3 is a circuit diagram illustrating the starter motor.
Figure 4:
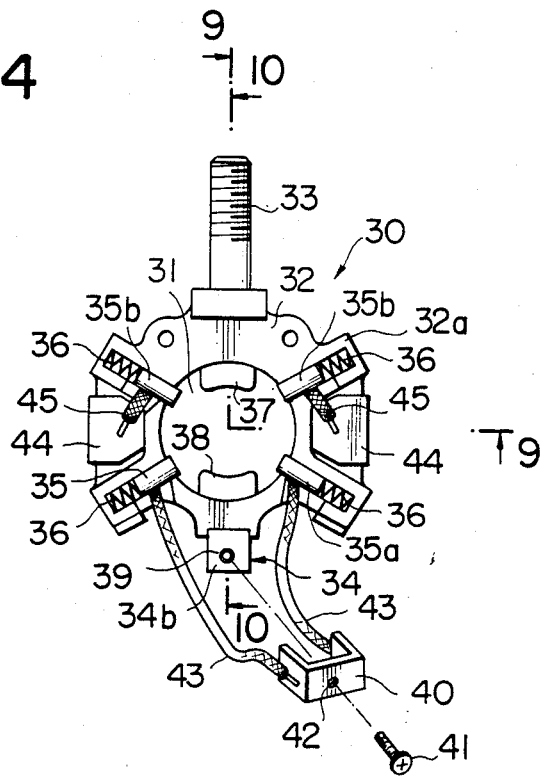
FIG. 4 is a front view of a brush and terminal assembly of one embodiment of the present invention.
Figure 5:
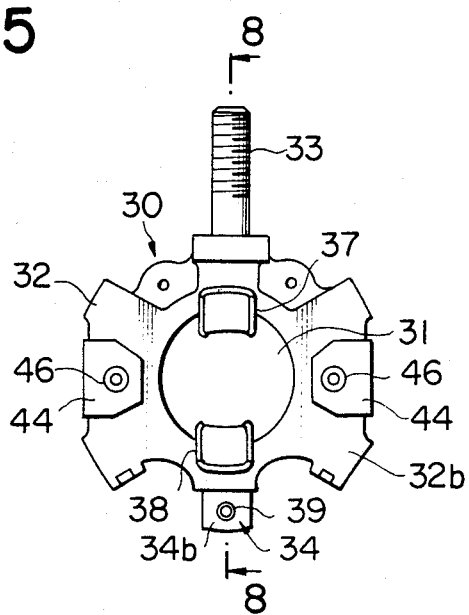
FIG. 5 is a back side view of the brush and terminal assembly shown in FIG. 4.
Figure 9:
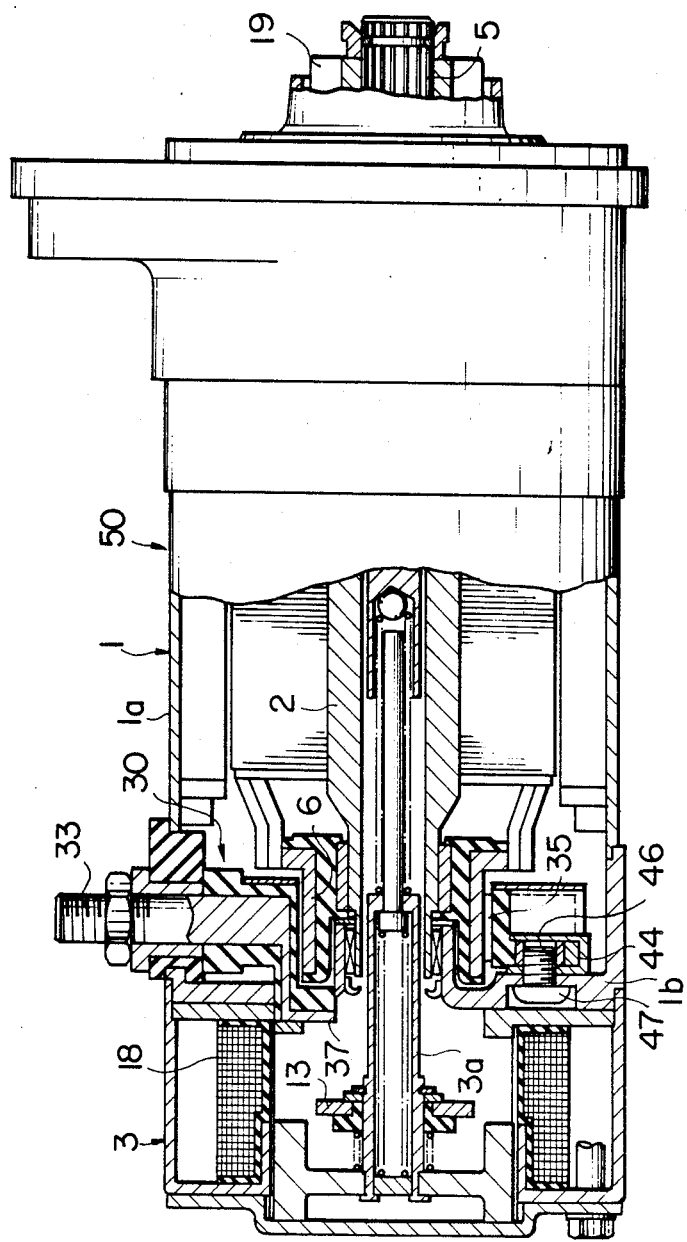
FIG. 9 is a sectional side view taken along line IX—IX of FIG. 4 illustrating a coaxial engine starter in which the brush and terminal assembly of the present invention is incorporated.
Figure 10:
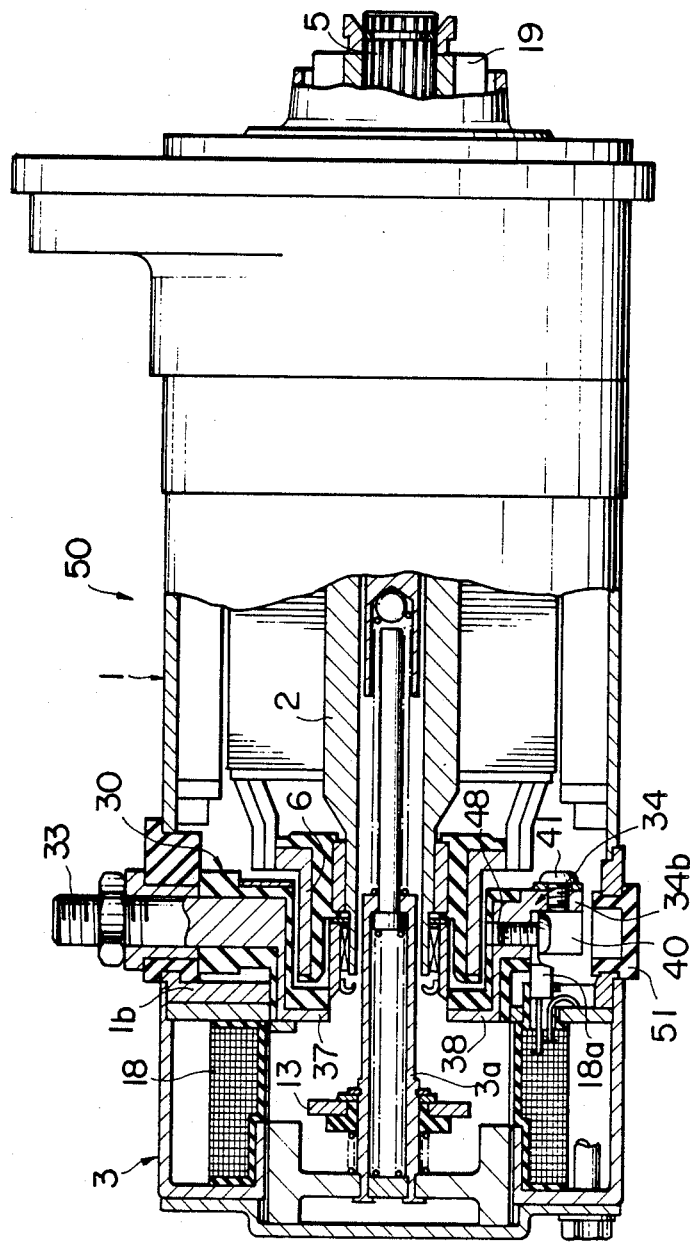
FIG. 10 is a sectional side view taken along line X—X of FIG. 4 illustrating the coaxial engine starter shown in FIG. 9.

FIGS. 4 to 8 illustrate a brush and terminal assembly 30 according to one embodiment of the present invention, and FIGS. 9 and 10 illustrate a coaxial engine starter 50 in which the brush and terminal assembly 30 illustrated in FIGS. 4 to 8 is employed. In particular, the components of the coaxial engine starter 50 shown in FIGS. 9 and 10 that are the same or corresponding to those of the conventional coaxial engine starter shown in FIGS. 1 and 2 are designated by the same reference numerals and their descriptions are omitted.

The brush and terminal assembly 30 of this embodiment comprises a support plate 32 having two major surfaces 32a and 32b and a central opening 31 for receiving therein the commutator 6 of the dc starter motor 1. The support plate 32 is made of an electrically insulating plastic material and has mounted thereon a terminal bolt 33 and a connection terminal unit 34 mounted to the support plate 32. The terminal bolt 33 is embedded at its bottom end within the molded resin of the top edge of the support plate 32. The connecting terminal unit 34 is also a mold-attached member having a cross section of an inverted "L" attached to the bottom edge of the support plate 32. The support plate 32 has mounted to its first major surface 32a a plurality of positive brushes 35a and negative brushes 35b. These positive and negative brushes 35a and 35b are radially disposed around the central opening 31 and are radially inwardly biased by springs 36 so that they contact the commutator under pressure when the commutator is inserted into the central opening 31.

On the other side or the second major surface 32b of the support plate 32, a pair of stationary contacts 37 and 38 are mounted at the diametrically opposite sides of the central opening 31. As best seen from FIG. 8, the stationary contacts 37 and 38 are formed integral with, and extensions of the terminal bolt 33 and the connection terminal unit 34, respectively and rearwardly project from, the second major surface 32b of the support plate 32. Thus, the terminal bolt 33 serves as a terminal of the stationary contact 37, and the connection terminal unit 34 serves as a terminal of the stationary contact 38, and these stationary contacts 37 and 38 serve as stationary contacts of a power switch of the starter motor 1.

As best seen in FIG. 8, the connecting terminal unit 34 has a base portion 34a at which the unit 34 is attached to the support plate 32 and a mounting tab 34b extending downward from of the front end of the base portion 34a. The base portion 34a an mounting tab 34b have threaded holes 39a and 39b, respectively. The mounting tab 34b has mounted thereon a connecting fitting 40 of a substantially U-shaped cross section secured by a screw 41 extending through the hole 42 and thread-engaging into the threaded hole 39 in the mounting tab 34b. The connecting fitting 40 has electrically connected to its ends by welding, for example, the ends of lead conductors 43 electrically connected to and extending from the positive brushes 35a.

On both side edges of the support plate 32, electrically conductive metal plates 44 having a substantially U-shaped cross-section are placed, and one of the leg portions of the "U" of each metal plate 44 on the first major surface 32a is connected to one end of lead wire 45 extending from the negative side brush 35b. The other of the leg portions of the "U" of the metal plate 44 on the second major surface 32b has formed therein a threaded hole 46 extending into the resin support plate 32. This threaded hole 46 is used for inserting a screw 47 (see FIG. 9) thereinto for mounting the brush and terminal assembly 30 to the rear bracket 1b of the engine starter. The metal plate 44 also serves as an earth terminal for the assembly when it is mounted to and in an electrically conductive relationship with the rear bracket 1b of the starter machine frame.

The description will be made as to the case where the brush and terminal assembly 30 as above described is assembled within a coaxial engine starter with reference to FIGS. 9 and 10. FIG. 9 is a sectional view of a coaxial engine starter 50 taken along line IX—IX in which the brush and terminal assembly 30 shown in FIG. 4 can be seen. The brush and terminal assembly 30 is secured within the starter by being sandwiched between the yoke 1a of the dc motor 1 and the rear bracket 1b with the commutator 6 inserted within the central opening 31 of the support plate 32 and by thread-engaging the screw 47 extending through the rear bracket 1b into the threaded hole 46 formed in the metal plate 44 and the support plate 31.

Then, the solenoid switch 3 is mounted to the rear portion of the rear bracket 1b. At this time, a metal fitting 18a connected to the lead-out portion of the current coil 18 of the solenoid switch 3 is secured by a screw 48 to the base portion 34a of the connecting terminal unit 34 of the brush and terminal assembly 30. The screw 48 may be formed at the corresponding position on the rear bracket 1b, so that the screw 48 may be thread-engaged into the thread hole 49 by a screw driver inserted through a notch which usually is closed by a cap 51. In this position, the pair of stationary contacts 37 and 38 of the brush and terminal assembly 30 project outwardly from the central opening of the rear bracket 1b so that they can be contacted by a movable bridge contact 13 of the solenoid switch 3.

As has been described, according to the brush and terminal assembly of the present invention, the support plate has mounted thereon brushes, a pair of stationary contacts for energizing and deenergizing the electric motor, and terminal bolt and a connecting terminal unit connected to the respective stationary contacts, so that its assembly is very simple. Since the lead conductor from the positive side brush is connected to the connecting terminal unit connected to one of the stationary contacts, most of the wiring conductors can be enclosed within the motor frame. Also, since only a single terminal bolt projects from the machine frame of the starter, the easiness of installation of the assembly to the engine and the efficiency of the lay-out are improved.

What is claimed is:

1. A brush and terminal assembly for use in an engine starter having a motor including a commutator mounted on an armature rotary shaft, comprising:

a support plate having two major surfaces and a central opening for receiving therein the commutator of the motor;

a plurality of positive and negative brushes mounted to one of said major surfaces of said support plate and spring biased in radially inward direction of said central opening;

a terminal bolt and a connection terminal unit mounted to said support plate;

a pair of stationary contacts projectingly mounted to the other of said major surfaces of said support plate for use as contacts of an on/off switch of the electric motor, one of said stationary contacts being electrically connected to said terminal bolt and the other of said stationary contacts being electrically connected to said connecting terminal unit; and lead conductors having one end connected to said positive brushes and the other end connected together to said connecting terminal unit.

2. A brush and terminal assembly as claimed in claim 1, further comprising an electrically conductive metal fitting attached to said support plate for connection to said negative brush, said electrically conductive metal fitting having a threaded hole for receiving therein a screw for mounting the brush and terminal assembly to the starter.

* * * * *